US006450021B1

United States Patent
Katou et al.

(10) Patent No.: US 6,450,021 B1
(45) Date of Patent: Sep. 17, 2002

(54) TRANSMITTER AND TRANSMITTING METHOD OF TIRE AIR PRESSURE MONITORING APPARATUS

(75) Inventors: Michiya Katou, Ichinomiya; Akira Momose, Hashima, both of (JP)

(73) Assignee: Pacific Industrial Co., Ltd. (JP)

( * ) Notice: Subject to any disclaimer, the term of this patent is extended or adjusted under 35 U.S.C. 154(b) by 0 days.

(21) Appl. No.: 09/432,193

(22) Filed: Nov. 2, 1999

(51) Int. Cl.[7] .......................... G01M 15/00; B60C 23/00
(52) U.S. Cl. ..................... 73/146.5; 340/442; 73/146.4; 702/138; 116/34 R
(58) Field of Search ............................. 73/146.5, 146.2, 73/146.8, 146.3, 146; 340/442, 445, 447, 443; 116/34 R; 702/138

(56) References Cited

U.S. PATENT DOCUMENTS

| 5,231,872 A | * | 8/1993 | Bowler et al. | 73/146.5 |
| 5,612,671 A | * | 3/1997 | Mendez et al. | 340/447 |
| 5,710,539 A | * | 1/1998 | Iida | 340/444 |
| 5,731,516 A | * | 3/1998 | Handfield et al. | 73/146.5 |
| 5,748,076 A | * | 5/1998 | Horie | 340/442 |
| 5,895,846 A | | 4/1999 | Chamussy et al. | 73/146.2 |
| 5,924,055 A | * | 7/1999 | Hattori | 702/138 |
| 6,087,930 A | * | 7/2000 | Kulka et al. | 340/447 |

FOREIGN PATENT DOCUMENTS

WO   WO/9214620   9/1992

\* cited by examiner

*Primary Examiner*—Harshad Patel
(74) *Attorney, Agent, or Firm*—Madson & Metcalf

(57) ABSTRACT

A tire air monitoring apparatus includes transmitters for wirelessly transmitting data regarding the inner pressure of tires and a receiver for receiving the data transmitted by the transmitters. Each transmitter is powered by a battery. Each transmitter includes a pressure sensor, which measures the inner pressure of the tire at predetermined measuring intervals. Each transmitter periodically and wirelessly transmits data every time the pressure sensor has taken a measurement a predetermined number of times. When the tire pressure changes by an amount that is equal to or greater than a predetermined upper limit value during a predetermined judging time, the transmitter performs an early data transmission. Therefore, an abnormality in the tire pressure is immediately communicated to a driver, and battery strength is conserved.

14 Claims, 3 Drawing Sheets

TRANSMITTER AND TRANSMITTING METHOD OF TIRE AIR PRESSURE MONITORING APPARATUS

BACKGROUND OF THE INVENTION

The present invention relates to an apparatus for monitoring air pressure of automobile tires. More particularly, the present invention pertains to a transmitter and method for transmitting information regarding tire air pressure to a receiver mounted on a vehicle body.

Wireless tire air pressure monitoring apparatuses for allowing a driver in a vehicle passenger compartment to check the pressure of vehicle tires have been proposed. One such monitoring system includes transmitters and a receiver. Each transmitter is located in one of the wheels and the receiver is located in the body frame of the vehicle. Each transmitter detects the pressure of the associated tire and wirelessly transmits the detection information. The receiver receives information from the transmitters.

Since each transmitter is powered by a battery, the transmitter stops operating when the battery runs down. Each transmitter is attached to the corresponding wheel and is located in the corresponding tire. To change the battery of a transmitter, the tire must be removed from the wheel. Changing the battery of a transmitter is therefore burdensome. Further, the transmitters are constructed with a high accuracy to be durable against the harsh condition in the tire. Therefore, opening the casing of a transmitter for changing the battery can make the transmitter less reliable. Accordingly, changing the battery is not practical.

The capacity of the battery may be increased to permit the transmitter to function for a long period without changing the battery. This, however, increases the size and the weight of the battery thus altering the balance of the corresponding tire. Therefore, the capacity of the battery cannot be increased beyond a certain limit.

To extend the life of the batteries, some prior art apparatuses use transmitters that only periodically transmit signals. This minimizes the cumulative operating time of the transmitters, which allows batteries having a relatively small capacity to be used for a long period.

Tire pressure can change at various rates. For example, natural leakage of air gradually decreases the pressure of a tire. When a tire goes flat due to damage, the air pressure drops quickly. Further, the rates of pressure loss from natural leakage and the damage vary according to the circumstances. Thus, there is a demand for an air monitoring apparatus that immediately detects rapid air pressure changes and extends battery life.

However, simply making transmissions from a transmitter periodic cannot satisfy this need. As long as the tire pressure decreases slowly, relatively long transmission intervals cause no problem in detecting an abnormality. However, if the tire pressure suddenly decreases, the driver will not be immediately informed of abnormality. If the transmission intervals are relatively short, the driver will be immediately notified of a sudden drop in tire pressure. However, the short intervals increase the cumulative operating time of the transmitter, which shortens the life of the battery.

SUMMARY OF THE INVENTION

Accordingly, it is an objective of the present invention to provide a transmitter in a tire air monitoring apparatus and a method that immediately inform a driver of air pressure abnormality and conserve battery strength.

To achieve the foregoing and other objectives and in accordance with the purpose of the present invention, a battery-powered transmitter for wirelessly transmitting data regarding the inner pressure of a vehicle tire is provided. The transmitter includes a pressure sensor for measuring the inner pressure of the tire, a transmission circuit for wirelessly transmitting data representing the measured tire pressure and a controller for controlling the transmission circuit to periodically transmit the data at predetermined transmission intervals. When the tire pressure changes by an amount that is equal to or greater than a predetermined upper limit value during a predetermined judging time, the controller controls the transmission circuit to transmit the data earlier than the next data transmission that would take place according to the periodic transmission intervals.

In another aspect of the present invention, a method for wirelessly transmitting data regarding the inner pressure of a vehicle tire by a battery-powered transmitter, is provided. The method includes measuring the inner pressure of the tire, periodically and wirelessly transmitting data representing the measured tire pressure at regular transmission intervals and performing an early wireless transmission, which occur before the next data transmission would take place according to the regular transmission intervals, when the tire pressure changes by an amount that is equal to or greater than a predetermined upper limit value during a predetermined judging time.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
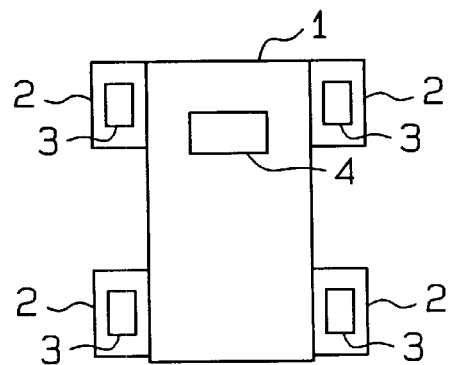
FIG. 1 is a diagrammatic view illustrating a tire air pressure monitoring apparatus according to one embodiment of the present invention.

A tire air pressure monitoring apparatus according to one embodiment of the present invention will now be described with reference to FIGS. 1 to 6. As shown in FIG. 1, the tire air pressure monitoring apparatus includes four tires 2 of a vehicle 1, four transmitters 3, each located in one of the tires 2, and a receiver 4 mounted on the body frame of the vehicle 1. Each transmitter 3 is secured to the wheel of the associated tire 2 such that the transmitter 3 is located within the associated tire 2. Each transmitter 3 detects the air pressure of the associated tire 2 and sends a signal containing the detection information to the receiver 4.

Figure 2:
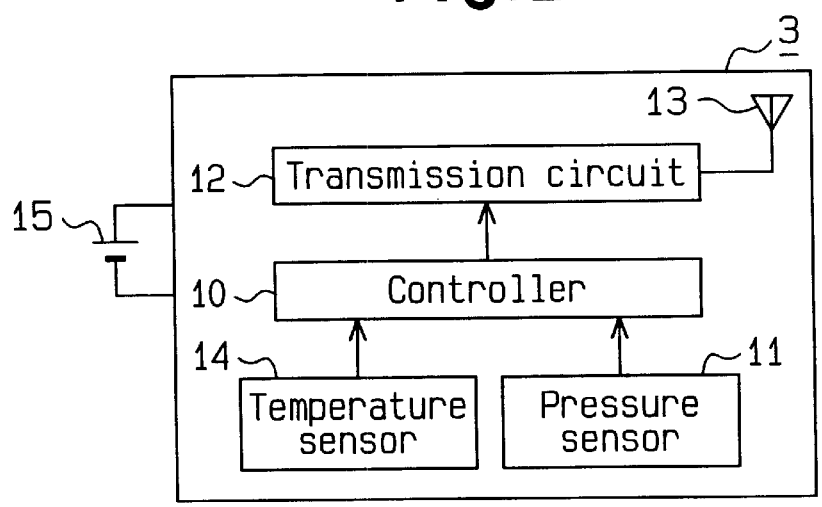
FIG. 2 is a block diagram illustrating a transmitter in the apparatus of FIG. 1.

As shown in FIG. 2, each transmitter 3 includes a controller 10, which is, for example, a microcomputer. The controller 10 includes a central processing unit (CPU), a random access memory (RAM) and a read only memory (ROM). A specific ID code is registered in each controller 10. The ID code is used to distinguish the associated transmitter 3 from the other three transmitters 3.

A pressure sensor 11 located in each tire 2 measures the internal air pressure of the associated tire 2 and sends data representing the detected pressure to the controller 10. The controller 10 sends the received pressure data and the ID code to a transmission circuit 12. The transmission circuit 12 sends data, which includes the pressure data and the ID code, to the receiver 4 through a transmission antenna 13.

A temperature sensor 14 measures the temperature in the associated tire 2 and outputs temperature data to the controller 10. A battery 15 is a power source of the transmitter 3. That is, the transmitter 3 is powered by the battery 15. The controller 10, the pressure sensor 11, the transmission circuit 12, the antenna 13, the temperature sensor 14 and the battery 15 are housed in a casing (not shown).

Figure 5:
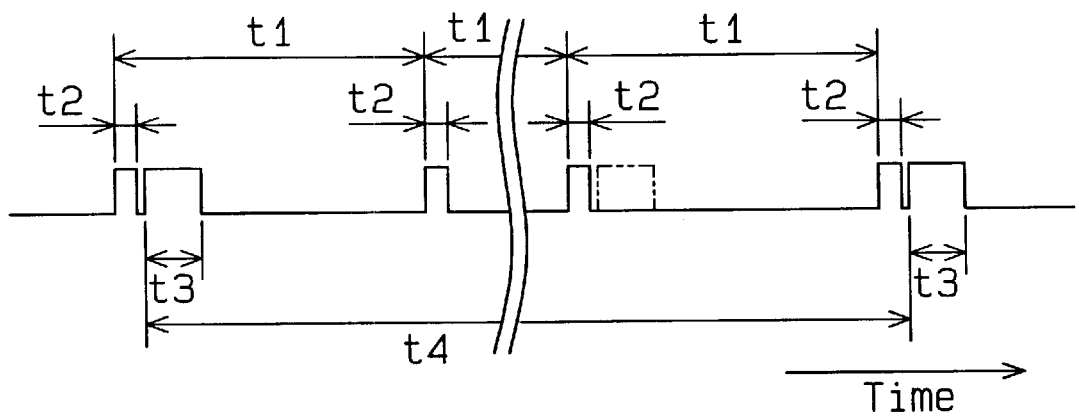
FIG. 5 is a timing chart showing operation of the transmitter of FIG. 2.

As shown in FIG. 5, the controller 10 commands the pressure sensor 11 and the temperature sensor 14 to take a measurement at every predetermined time interval t1 (fifteen seconds in this embodiment). The time t1 will be referred to as a measuring interval. A time period t2 shown in FIG. 5 is a period from when the pressure sensor 11 and the temperature sensor 14 start measuring until the resultant data is processed by the controller 10. The time t2 will be referred to as a measuring time.

The controller 10 counts the number of times that the pressure sensor 11 performs measuring and commands the transmission circuit 12 to transmit signals when the number of measuring times reaches a certain number (forty in this embodiment). In this embodiment, the measuring interval t1 of the pressure sensor 11 and the temperature sensor 14 is fifteen seconds. Therefore, as shown in FIG. 5, the controller 10 commands the transmission circuit 12 to transmit signals at predetermined time intervals t4, which are ten minutes (10 minutes=15 seconds×40) in this embodiment. The time t4 will be referred to as a transmission interval. A time period t3 in FIG. 5 represents a period during which the transmission circuit 12 is performing a transmission. The time t3 will hereafter be referred to as a transmission time.

The transmitter 3 is in a sleep state and consumes little battery energy other than during the measuring time t2 and the transmission time t3.

The measuring interval t1 and the transmission interval t4 is determined considering the capacity of the battery 15, the power consumption of the transmitter 3 and the operating times t2, t3 of the transmitter 3. It has been confirmed that, if the battery 15 has a capacity of 1000 mAh, the measuring interval t1 is fifteen seconds, and the transmission interval t4 is ten minutes, the life of the battery 15 is more than ten years.

The controller 10 commands the transmission circuit 12 to perform a transmission at every transmission interval t4. However, when a predetermined condition is satisfied based on the pressure data from the pressure sensor 11 and temperature data from the temperature sensor 14, the controller 10 commands the transmission circuit 12 to perform an early transmission as shown by the broken line in FIG. 5 in addition to the periodical transmissions at every transmission interval t4. The transmission condition is satisfied, for example, when the pressure of the tire 2 abruptly changes or when the internal temperature of the tire 2 is abnormally increased.

Figure 3:
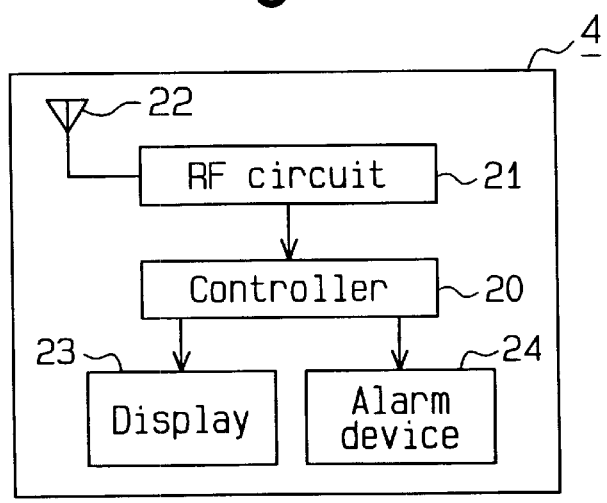
FIG. 3 is a block diagram illustrating a receiver in the apparatus of FIG. 1.

As shown in FIG. 3, the receiver 4 includes a controller 20, which is, for example, a microcomputer. The controller 20 includes a central processing unit (CPU), a random access memory (RAM) and a read only memory (ROM). An RF circuit 21 receives data transmitted from the transmitters 3 through a reception antenna 22 and sends the data to the controller 20. Based on the ID code and pressure data contained in the received data, the controller 20 obtains the internal pressure of the tire 2 corresponding to the transmitter 3 that has sent the data.

The controller 20 also displays information regarding the tire pressure and other data on a display 23. The display 23 is located in view of the driver. The controller 20 also commands an alarm device 24 to warn a driver of an abnormal tire pressure. The alarm device 24 may be a device that generates sound or a device that emits light for indicating a tire pressure abnormality. Alternatively, notice of a tire pressure abnormality may be displayed on the display 23. The receiver 4 is activated, for example, when the ignition key (not shown) is turned on.

Operation of each transmitter 3 will now be described with reference of the flowchart of FIG. 4. The controller 10 repeatedly performs the routine of FIG. 4 every fifteen seconds, which is the measuring interval t1.

At step S1, the controller 10 detects the pressure $P_X$ in the tire 2 by the pressure sensor 11 and detects the temperature $T_X$ in the tire 2 by the temperature sensor 14. At step S2, the controller 10 adds one to a count value C and sets the resultant as a new count value C. The count value C represents the number of times the pressure sensor 11 has taken a measurement.

At step S3, the controller 10 judges whether the count value C has reached forty, or whether the pressure sensor 11 has measured the pressure in the tire 2 forty times. If the count value C has reached forty, the controller 10 judges that transmission interval t4, which is ten minutes, has elapsed and moves to step S4. At step S4, the controller 10 sets the count value C to zero and moves to step S5. At step S5, the controller 10 commands the transmission circuit 12 to transmit transmission data and temporarily stops the routine. The transmission data includes the ID code and the data representing the detected pressure $P_X$.

If the count value C has not reached forty at step S3, the controller 10 moves to step S6. At step S6, the controller 10 judges whether the absolute value of the difference between the pressure $P_{X-1}$ of the previous routine and the pressure $P_X$ of the current routine is equal to or greater than a predetermined upper limit value P1 (20 kPa in this embodiment). In other words, the controller 10 judges whether the pressure in the tire 2 has changed by an amount equal to or greater than 20kPa within fifteen seconds, or between from the previous pressure detection and the current pressure detection. If the determination is positive at step S6, the controller 10 judges that the pressure of the tire 2 has significantly changed in a short time and moves to step S5. Therefore, as shown by the broken line in FIG. 5, the air pressure $P_X$, which was detected in the current routine, is transmitted by the transmission circuit 12 by a transmission that is additional to the regular transmissions, which occur at every transmission interval t4.

If the determination is negative at step S6, the controller 10 moves to step S7 and computes the difference between the air pressure $P_X$ of the current routine and the pressure $P_{X-2}$ of two cycles of the routine earlier. The controller 10 then judges whether the pressure difference is equal to or greater than a second upper limit value P2 (20 kPa in this embodiment). In other words, the controller 10 judges whether the pressure of the tire 2 has changed by an amount equal to or greater than 20 kPa during a period from the pressure detection of two cycles of the routine earlier until the pressure detection of the current routine, or within thirty seconds. If the determination is positive at step S7, the controller 10 judges that the tire pressure is abnormal, although the pressure in the tire 2 is changing at a slower rate than when the determination is positive at step S6. In this case, the controller 10 moves step S5. Thus, as in the case where the determination of step S6 is positive, the pressure $P_X$, which is detected in the current routine, is transmitted by the transmission circuit 12 at a time other than the regular transmission intervals t4.

As described above, if the pressure of the tire 2 is judged to be changing relatively rapidly in steps S6 or S7, the controller 10 commands the transmission circuit 12 to perform an additional transmission, which occurs between the regular transmissions, thereby informing the driver of the tire pressure abnormality.

If the determination is negative at step S7, the controller 10 moves to step S8 and judges whether the temperature $T_X$ in the tire 2 is equal to or higher than a predetermined highest value (120° C. in this embodiment). If the temperature $T_X$ is equal to or higher than 120° C., the controller 2 judges that the pressure in the tire 2 is abnormal and moves to step S9. At step S9, the controller 10 sets a temperature flag F to one and moves to step S5. Thus, in addition to the regular transmissions at the transmission intervals t4, the pressure $P_X$ detected in the current routine is transmitted by the transmission circuit 12.

If some air has leaked from the tire 2 and the leakage has stopped, the pressure in the tire 2 stops changing over time, which results in negative determinations in steps S6 step S7. Therefore, additional data transmissions due to rapid pressure changes do not occur. However, when the tire pressure is too low, the tire generates more heat, which increases the temperature inside the tire 2. Therefore, if some air has leaked from the tire 2, the inner temperature of the tire 2 is relatively high. Thus, when the inner temperature $T_X$ of the tire 2 is equal to or higher than 120° C., an additional data transmission takes place according to steps S8 and S5 of the flowchart.

If the temperature $T_X$ is lower than 120° C. at step S8, the controller 10 moves to step S10 and judges whether the temperature $T_X$ is equal to or lower than 110° C. If the temperature $T_X$ is not equal or lower than 110° C., that is, if the temperature $T_X$ is higher than 110° C and lower than 120° C., the controller 10 moves step S11. At step S11, the controller 10 judges whether the temperature flag F is one. If the temperature flag F is one, the controller 10 moves to step S5 to perform transmission. If the temperature flag F is not one, the controller 10 temporarily stops the routine without performing a further data transmission.

If the tire interior temperature $T_X$ is equal to or lower than 110° C. at step S10, the controller 10 judges that there is no abnormality in the temperature of the tire 2 and moves to step S12. At step S12, the controller 10 sets the temperature flag F to zero and temporarily stops the routine. Therefore, if the temperature in the tire 2 falls below 110° C. after reaching beyond 120° C., the additional transmissions based on high tire temperature are stopped.

Figure 6:
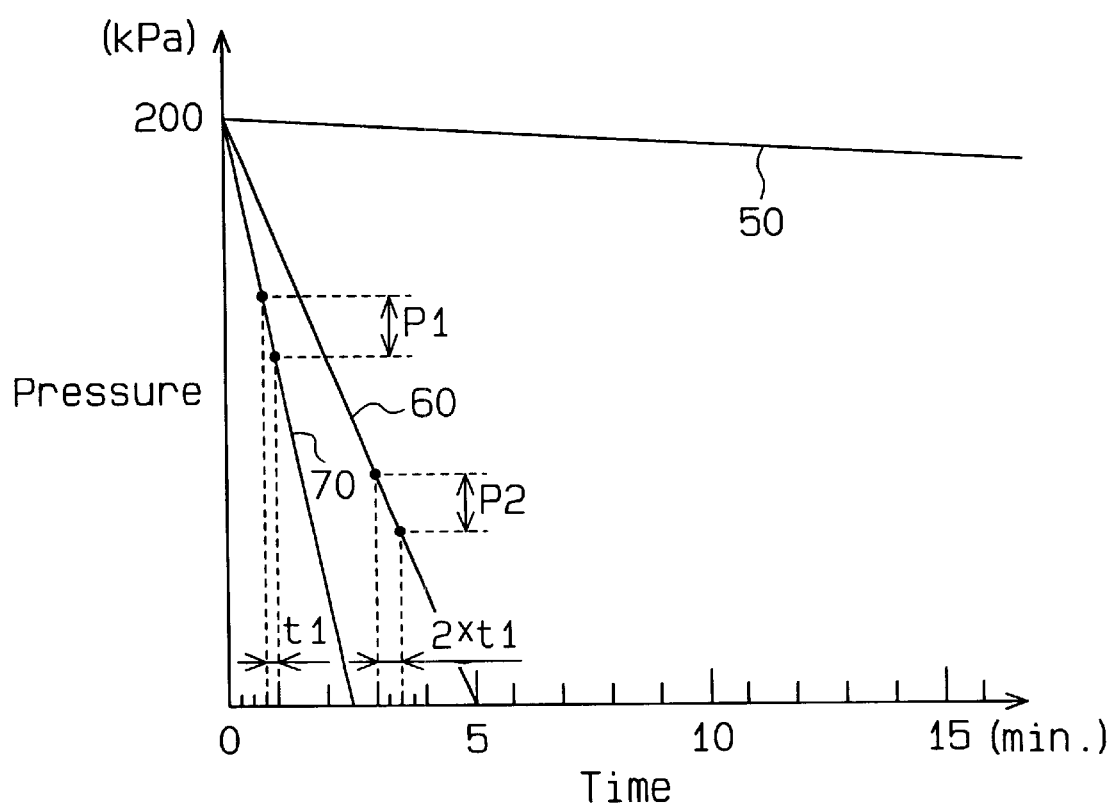
FIG. 6 is graph showing the relationship between changes of tire pressure and time.

FIG. 6 is a graph showing the relationship between the changes in tire pressure over time and transmission performed by the transmitter 3. In the graph of FIG. 6, a standard tire pressure is 200 kPa. When the decrease of the tire air pressure is very gradual as shown by solid line 50 of FIG. 6, periodic transmissions at every transmission interval t4, which is ten minutes, are sufficient. In other words, it is sufficient to inform the driver of pressure changes in the tire 2 every ten minutes. However, the ten-minute intervals are too long to immediately inform the driver of a sudden pressure decrease of the tire 2 as shown by solid lines 60 or 70.

Solid line 70 of FIG. 6 represents a state where the air loss from a tire is so rapid that the pressure falls to zero in two minutes and thirty seconds. In this state, the tire air pressure decreases by 20 kPa, which is the first limit value Pi, in the measuring interval t1, which is fifteen seconds. When the tire air pressure decreases as shown by the solid line 70, or when the air pressure decreases more rapidly than is represented by the solid line 70, the determination of step S6 is positive, and an additional transmission, other than periodic transmissions at every interval t4, is performed. Accordingly, the sudden decrease in the tire air pressure is immediately communicated to the driver through the receiver 4.

According to an experiment, all the pressure in the tire 2 was lost in one minute and thirty seconds when the tire valve was loosened. The transmitter 3 of this embodiment responds to such a rapid decrease of the tire air pressure and quickly transmits pressure data regarding the abnormality.

Solid line 60 of FIG. 6 represents a case where all the pressure from one of the tires 2 is lost in five minutes. In this case, the tire pressure decreases by 20 kPa, which is the second upper limit P2, in thirty seconds, which is twice as long as the measuring interval t1 of the transmitter 3. Although the rate of air pressure loss is lower compared to the case of solid line 70, the determination of step S7 of FIG. 4 is positive if the tire air pressure decreases as shown by solid line 60 or more quickly. In these cases, the additional data transmission is performed. Therefore, a tire pressure decrease that is gradual but is not normal is immediately communicated to the driver by the receiver 4.

Solid line 60 shows a case where the tire air pressure decreases by 10 kPa in the measuring interval t1 of the transmitter 3, which is fifteen seconds. Therefore, it seems reasonable to judge whether a pressure change is equal to or higher than 10 kPa in step S7 of FIG. 4. However, when the vehicle 1 is running, the inner pressure of the tire 2 constantly changes due to the condition of the road surface. Further, the inner temperature of the tire 2, which affects the inner pressure of the tire 2, is constantly changing due to changes in the condition of the road surface condition and the speed of the vehicle 1. Such changes in the air pressure due to movement of the vehicle 1 may reach or sometimes exceed 10 kPa. Thus, if a change in the tire air pressure that is equal to or greater than 10 Pka within fifteen seconds is judged to satisfy the transmission condition, the condition is likely to be satisfied by normal air pressure changes due to the movement of the vehicle. This will result in too many transmissions, which will shortens the life of the battery 15.

Figure 4:
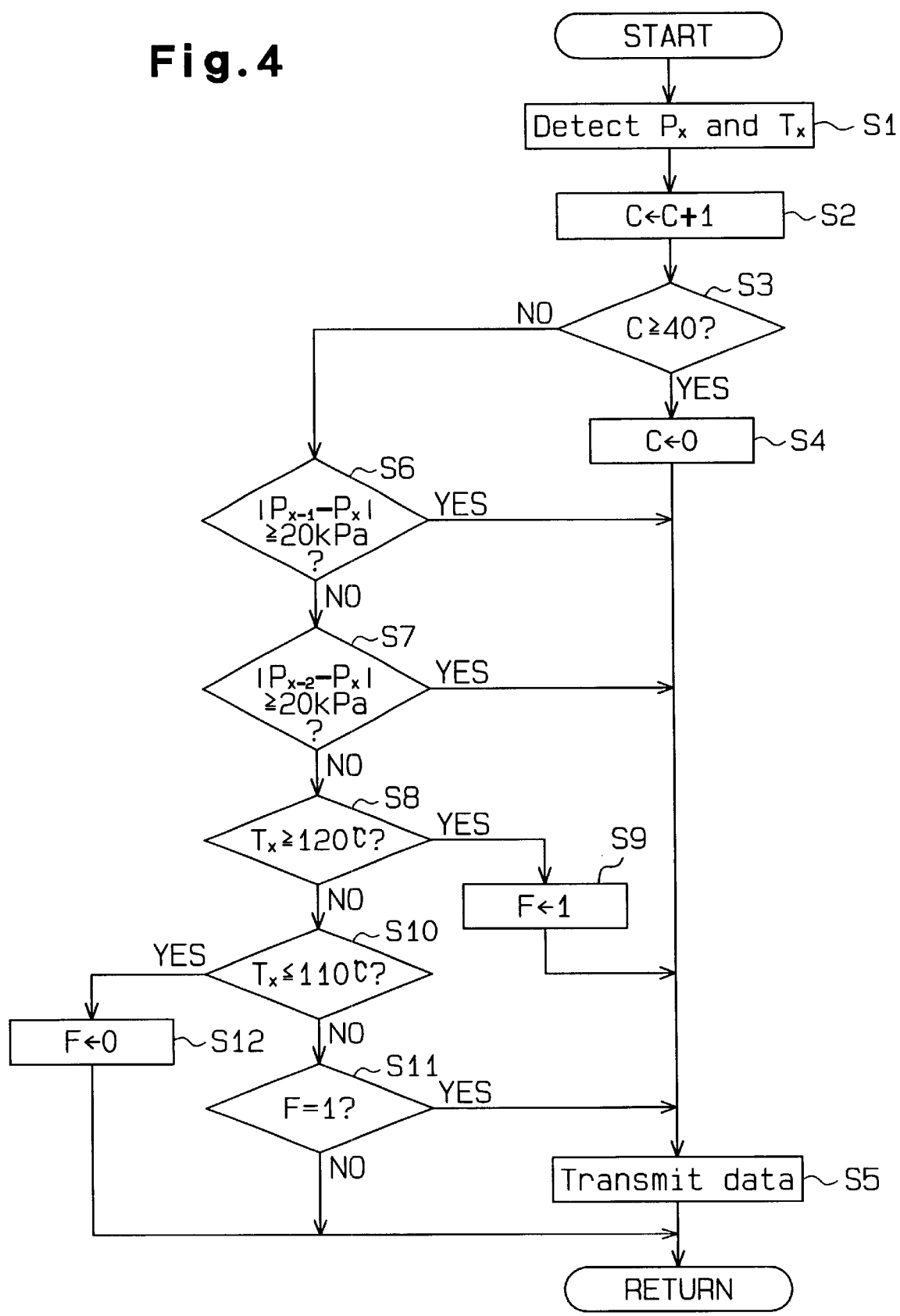
FIG. 4 is a flowchart showing operation of the transmitter of FIG. 2.

Therefore, at step S7 in FIG. 4, whether an air pressure change in thirty seconds is equal to or greater than 20 kPa is judged. The second upper limit value P2, which is 20 kPa, is greater than normal air pressure fluctuations caused by movement of the vehicle 1. Thus, normal pressure fluctuations do not satisfy the transmission condition. Therefore, unnecessary transmissions are prevented, which extends the life of the battery 15.

If air has leaked from the tire 2 but is no longer leaking, the air pressure of the tire 2 stops changing over time. In such case, if the inner temperature of the tire 2 becomes equal to or greater than 120° C., an additional data transmission, other than the regular transmissions, is performed to inform the driver of the tire pressure abnormality.

As described above, each transmitter 3 transmits information at the regular transmission interval t4. This shortens the accumulated operating time of each transmitter 3 thereby allowing the battery 15, which has a limited capacity, to activate the transmitter 3 for relatively long time. Accordingly, the transmitters 3 do not require large-capacity batteries, which are heavy and cumbersome.

When there is a need to inform the driver of a tire pressure abnormality, for example, when the tire air pressure suddenly drops, the transmitter 3 performs an irregular transmission, in addition to the regular transmissions. Accordingly, the driver is informed of the abnormality earlier than would otherwise occur. However, such air pressure abnormalities are unusual and thus have little effect on the life of the battery 15.

It should be apparent to those skilled in the art that the present invention may be embodied in many other specific forms without departing from the spirit or scope of the invention. Particularly, it should be understood that the invention may be embodied in the following forms.

The measuring interval t1 is not limited to fifteen seconds but may be altered according to the type of the tires 2 in which the transmitters 3 are mounted. Also, the transmission interval t4 is not limited to ten minutes. The transmission interval t4 may be changed by changing the measuring interval t1. Alternatively, the transmission interval t4 may be altered by changing the number of measurements (forty in the illustrated embodiment) by the pressure sensor 11, which determines whether the transmission interval t4 has elapsed.

The first and second upper limit values P1, P2 are not limited to 20 kPa but may be changed to any values that are greater than normal tire pressure fluctuations caused by movement of the vehicle I during the relevant time period. At step S6 in FIG. 4, an air pressure change during the measuring interval t1 is monitored. However, the air pressure changes may be monitored during an integer multiple of the interval t1. Likewise, at step S7 of FIG. 4, air pressure changes may be monitored during a time that is equal to or greater than the doubled measurement interval t1.

At step S8 of FIG. 4, the transmission condition is judged referring to whether the air temperature reaches 120° C. However, the reference temperature may be altered.

The temperature in the tire 2 detected by the temperature sensor 14 may be transmitted to the receiver 4 with the data representing the pressure of the tire 2 and be displayed on the display 23.

The temperature sensor 14 may be omitted, which allows the transmitter 3 having minimal functions to be manufactured at minimal cost.

Therefore, the present examples and embodiments are to be considered as illustrative and not restrictive and the invention is not to be limited to the details given herein, but may be modified within the scope and equivalence of the

What is claimed is:

1. A battery-powered transmitter for wirelessly transmitting data regarding an inner pressure of a vehicle tire, the transmitter comprising:
    a pressure sensor for measuring the inner pressure of the tire;
    a transmission circuit for wirelessly transmitting data representing the measured tire pressure; and
    a controller for controlling the transmission circuit to periodically transmit the data at predetermined transmission intervals, wherein, when the tire pressure changes by an amount that is equal to or greater than a first predetermined upper limit value during a first predetermined judging time, the controller controls the transmission circuit to transmit the data earlier than the next data transmission that would take place according to the periodic transmission intervals, and wherein, when the tire pressure changes by an amount that is equal to or greater than a second predetermined upper limit value during a second judging time, the controller controls the transmission circuit to transmit the data earlier than the next data transmission that would take place according to the periodic transmission intervals, wherein second judging time is an integer multiple of the first judging time and wherein the integer multiple is two or more.

2. The transmitter according to claim 1, wherein the controller controls the pressure sensor to measure the tire pressure at predetermined measuring intervals, and wherein the length of the transmission interval is an integer multiple of the length of one of the measuring intervals.

3. The transmitter according to claim 2, wherein the length of the first judging time is equal to the length of one of the measuring intervals or an integer multiple of the length of one of the measuring intervals.

4. The transmitter according to claim 1, wherein the second upper limit value is equal to the first upper limit value.

5. The transmitter according to claim 1, wherein the first and second upper limit values are greater than normal fluctuations of the tire pressure that would be expected during the corresponding judging time due to movement of the vehicle.

6. The transmitter according to claim 1, further comprising a temperature sensor for measuring the inner temperature of the tire, and wherein, when the measured inner temperature of the tire is equal to or higher than a predetermined value, the controller controls the transmission circuit to transmit the data earlier than the next data transmission that would take place according to the periodic transmission intervals.

7. The transmitter according to claim 6, wherein the controller controls the pressure sensor and the temperature sensor to take a measurement at predetermined measuring intervals, and wherein the length of the transmission interval is an integer multiple of the length of one of the measuring intervals.

8. A battery-powered transmitter for wirelessly transmitting data regarding an inner pressure of a vehicle tire, the transmitter comprising:
    a pressure sensor for measuring the inner pressure of the tire;
    a transmission circuit for wirelessly transmitting data containing the measured tire pressure; and
    a controller for controlling the pressure sensor to measure the tire pressure at predetermined measuring intervals, wherein the controller controls the transmission circuit to periodically and wirelessly transmit the data at regular transmission intervals, which occur every time the pressure sensor has taken a predetermined number of measurements, wherein, when the tire pressure changes by an amount that is equal to or greater than a first predetermined upper limit value during a first predetermined judging time, the controller controls the transmission circuit to transmit the data earlier than the next data transmission that would take place according to the regular transmission intervals, wherein the first judging time is equal to the measuring interval or an integer multiple of the measuring interval, and wherein, when the tire pressure changes by an amount that is equal to or greater than a second predetermined upper limit value during a second judging time, the controller controls the transmission circuit to transmit the data earlier than the next data transmission that would take place according to the regular transmission intervals, wherein the second judging time is an integer multiple of the first judging time and wherein the integer multiple is two or more.

9. The transmitter according to claim 8, wherein the second upper limit value is equal to the first upper limit value.

10. The transmitter according to claim 8, wherein the first and second upper limit values are greater than normal fluctuations of the tire pressure that would be expected during the corresponding judging time due to movement of the vehicle.

11. The transmitter according to claim 8, further comprising a temperature sensor for measuring the inner temperature of the tire, and wherein, when the measured inner temperature of the tire is equal to or higher than a predetermined value, the controller controls the transmission circuit to transmit the data earlier than the next data transmission that would take place according to the regular transmission intervals.

12. The transmitter according to claim 11, wherein the controller controls the temperature sensor to take a measurement at every measuring interval.

13. A method for wirelessly transmitting data regarding an inner pressure of a vehicle tire by a battery-powered transmitter, the method comprising:

periodically measuring the inner pressure of the tire at regular measuring intervals;

periodically and wirelessly transmitting data representing the measured tire pressure at regular transmission intervals;

periodically determining a tire pressure change;

comparing the tire pressure change to a first predetermined upper limit value during a first predetermined judging time;

performing a first early wireless transmission before the next data transmission would take place according to the regular transmission intervals, when the tire pressure change is equal to or greater than the first predetermined upper limit value during the first predetermined judging time;

comparing the tire pressure change to a second predetermined upper limit value during a second judging time;

performing a second early wireless transmission before the next data transmission would take place according to the regular transmission intervals, when the tire pressure change is equal to or greater than the second predetermined upper limit value during the second judging time, wherein the second judging time is an integer multiple of the first judging time.

14. The method according to claim 13, wherein the transmission interval is an integer multiple of the measuring interval.

* * * * *